(12) United States Patent
Price et al.

(10) Patent No.: US 11,502,308 B2
(45) Date of Patent: Nov. 15, 2022

(54) CATALYST-COATED MEMBRANE HAVING A LAMINATE STRUCTURE

(71) Applicant: JOHNSON MATTHEY HYDROGEN TECHNOLOGIES LIMITED, London (GB)

(72) Inventors: Emily Rose Price, Reading (GB); Edward Anthony Wright, Reading (GB)

(73) Assignee: Johnson Matthey Hydrogen Technologies Limited, London (GB)

( * ) Notice: Subject to any disclaimer, the term of this patent is extended or adjusted under 35 U.S.C. 154(b) by 0 days.

(21) Appl. No.: 16/472,503

(22) PCT Filed: Dec. 18, 2017

(86) PCT No.: PCT/GB2017/053775
§ 371 (c)(1),
(2) Date: Jun. 21, 2019

(87) PCT Pub. No.: WO2018/115821
PCT Pub. Date: Jun. 28, 2018

(65) Prior Publication Data
US 2020/0099061 A1 Mar. 26, 2020

(30) Foreign Application Priority Data
Dec. 22, 2016 (GB) ...................... 1621963

(51) Int. Cl.
*H01M 4/88* (2006.01)
*C25B 13/02* (2006.01)
(Continued)

(52) U.S. Cl.
CPC ............... *H01M 4/881* (2013.01); *C25B 1/04* (2013.01); *C25B 9/23* (2021.01); *C25B 9/73* (2021.01);
(Continued)

(58) Field of Classification Search
CPC .. C25B 1/02; C25B 1/04; C25B 1/042; C25B 1/044; C25B 9/23; C25B 13/02;
(Continued)

(56) References Cited

U.S. PATENT DOCUMENTS 5,472,799 A 12/1995 Watanabe
2002/0058172 A1 5/2002 Datz et al.
(Continued)

FOREIGN PATENT DOCUMENTS

EP 0631337 B1 12/1994
EP 1833112 A2 9/2007
(Continued)

OTHER PUBLICATIONS

Grigoriev et al., "Hydrogen Safety Aspects Related to High-Pressure Polymer Electrolyte Membrane Water Electrolysis," International Journal of Hydrogen Energy, vol. 38, No. 14, Jul. 1, 2009, pp. 5986-5991.
(Continued)

*Primary Examiner* — Ciel P Contreras
(74) *Attorney, Agent, or Firm* — BakerHostetler

(57) ABSTRACT

A catalyst-coated membrane (CCM) for use in a water electrolyser, having a laminate structure comprising: a first layer comprising a first membrane component having a cathode catalyst layer disposed on a first face thereof; a second layer comprising a second membrane component having an anode catalyst layer disposed on a first face thereof; and an intermediate layer disposed between the first and second layers, comprising a third membrane component having a recombination catalyst layer disposed on a first face thereof is disclosed. The CCM is useful within a water electrolyser. The recombination catalyst layer reduces the risk associated with hydrogen crossover and allows thinner membranes with lower resistance to be used.

17 Claims, 6 Drawing Sheets

(51) Int. Cl.
   *C25B 13/08*     (2006.01)
   *H01M 8/1018*    (2016.01)
   *C25B 1/04*      (2021.01)
   *C25B 9/23*      (2021.01)
   *C25B 9/73*      (2021.01)
   *C25B 11/081*    (2021.01)
   *C25B 11/097*    (2021.01)

(52) U.S. Cl.
   CPC ......... *C25B 11/081* (2021.01); *C25B 11/097* (2021.01); *C25B 13/02* (2013.01); *C25B 13/08* (2013.01); *H01M 8/1018* (2013.01); *H01M 2300/0082* (2013.01); *H01M 2300/0094* (2013.01)

(58) Field of Classification Search
   CPC ......... C25B 13/08; C25B 9/73; C25B 11/081; C25B 11/097; C25B 11/073; H01M 4/881; H01M 8/1018; H01M 2300/0082; H01M 2300/0094; H01M 8/04197; H01M 8/1004; H01M 2008/1095
   See application file for complete search history.

(56) References Cited

U.S. PATENT DOCUMENTS

| | | | |
|---|---|---|---|
| 2007/0154760 A1 | 7/2007 | Zhu et al. | |
| 2011/0042228 A1* | 2/2011 | Hinatsu | C25B 9/73 |
| | | | 205/344 |
| 2014/0116877 A1* | 5/2014 | Guillet | C25B 13/00 |
| | | | 204/282 |
| 2015/0322578 A1* | 11/2015 | Wakabayashi | H01M 8/1067 |
| | | | 429/482 |
| 2016/0010223 A1* | 1/2016 | Sato | C25B 9/73 |
| | | | 205/422 |
| 2018/0062192 A1* | 3/2018 | Capuano | H01M 8/1055 |

FOREIGN PATENT DOCUMENTS

| | | |
|---|---|---|
| KR | 2014-0045979 A | 4/2014 |
| WO | WO 0024074 A1 | 4/2000 |
| WO | WO 2009040571 A1 | 4/2009 |
| WO | WO 2009109780 A1 | 9/2009 |
| WO | 2012171918 A1 | 12/2012 |
| WO | WO 2014009721 A1 | 1/2014 |
| WO | WO 2015074637 A1 | 5/2015 |
| WO | WO 2015177542 A1 | 11/2015 |
| WO | WO 2016038349 A1 | 3/2016 |
| WO | 2014087957 A1 | 1/2017 |

OTHER PUBLICATIONS

GB1621963.6 Search Report Under Section 17(5) dated Sep. 1, 2017.
PCT/GB2017/053775 (WO 2018/115821 International Search Report dated Feb. 13, 2018.
PCTGB2017053775 (WO 2018/115821) Written Opinion dated Feb. 13, 2018.

* cited by examiner

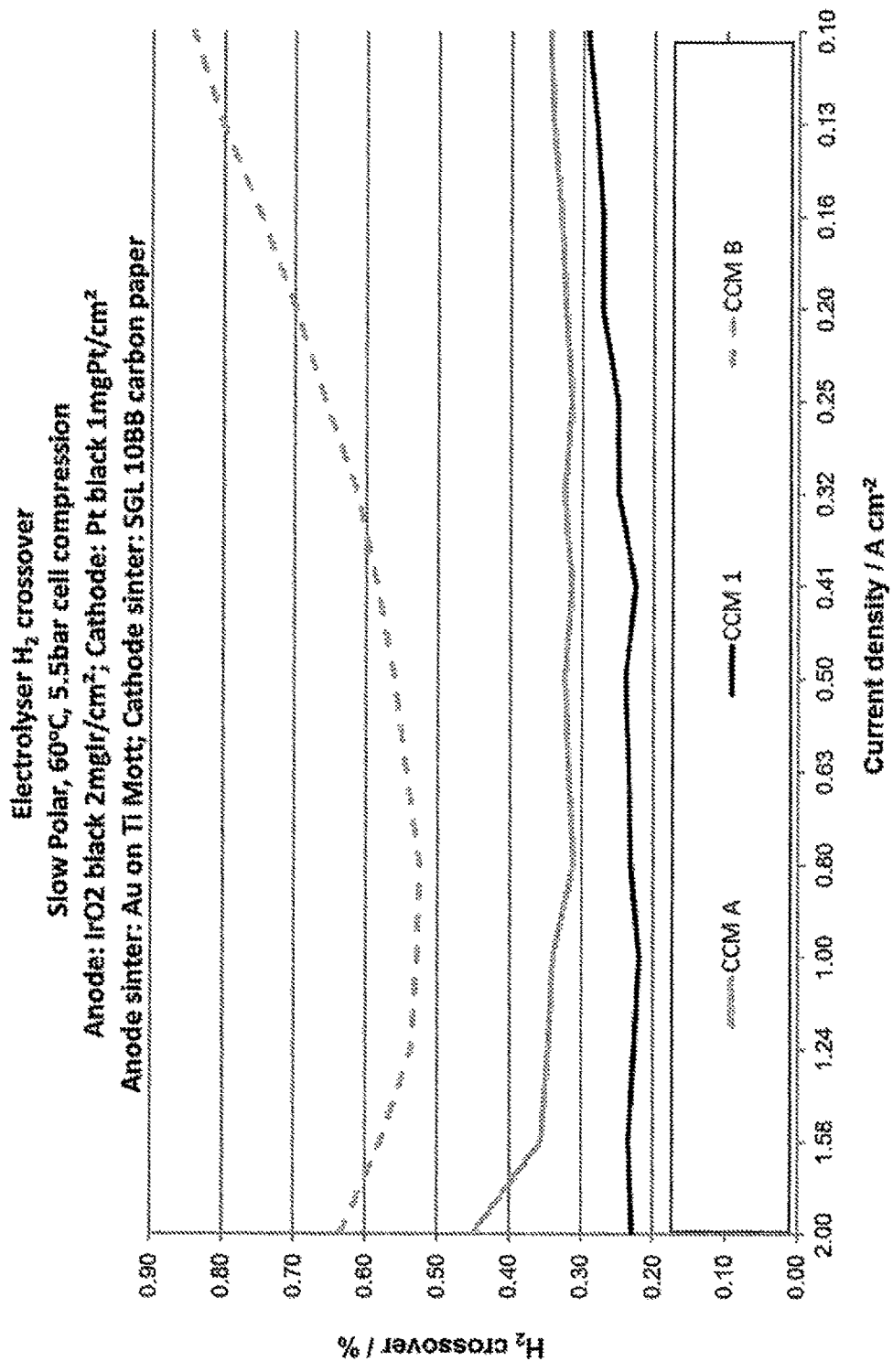

CATALYST-COATED MEMBRANE HAVING A LAMINATE STRUCTURE

CROSS-REFERENCE TO RELATED APPLICATIONS

This application is the National Stage of International Patent Application No. PCT/GB2017/053775, filed Dec. 18, 2017, which claims priority to Great Britain Patent Application No. 1621963.6, filed Dec. 22, 2016, the entire disclosures of both of which are incorporated herein by reference for any and all purposes.

TECHNICAL FIELD

The present invention relates generally to catalyst-coated membranes having a laminate structure, and in particular for their use in water electrolysers.

BACKGROUND ART

Electrolysis of water, to produce high purity hydrogen and oxygen can be carried out in both alkaline and acidic electrolyte systems and practical devices using both types of electrolyte systems exist as commercial products. Those electrolysers that are acid electrolyte-based typically employ a solid proton-conducting polymer electrolyte membrane (PEM) and are known as polymer electrolyte membrane water electrolysers (PEMWEs). A catalyst-coated membrane (CCM) is employed within the cell of a PEMWE, which comprises the PEM with two catalyst layers (for the anode and cathode reactions) applied on either face of the PEM. To complete the electrolysis cell, current collectors, which are typically metal meshes, are positioned either side of the CCM.

Although for efficient operation and maximum performance of a PEMWE, it is important to keep the electronic and ionic resistance across the CCM as low as possible, it is even more important to minimise any hydrogen crossover through the membrane into the oxygen stream. Traditionally, the means to minimise this ionic and electrical resistance and improve performance of the PEMWE is to reduce the thickness of the PEM as far as possible, but since hydrogen crossover is exacerbated by the use of a thin membrane in PEMWEs it is quite typical to employ costly membranes with thicknesses of over 100 µm, and typically close to 200 µm. In an electrolyser, the cathode is also known as the hydrogen electrode and is the electrode at which hydrogen is generated; the anode is also known as the oxygen electrode and is the electrode at which oxygen is generated. The result of any excessive crossover of hydrogen is a combination of molecular $H_2$ and molecular $O_2$ at the anode side, which is a potentially explosive mixture presenting a significant safety hazard, due to the wide explosive range of 5-95% $H_2$ in $O_2$.

Thus although improved performance would be obtained by the use of a thinner PEM in PEMWEs, in practice this has not been possible because of the increased hydrogen crossover and the resultant safety risk. Traditionally, PEM thickness in PEMWEs are greater than 100 µm (for example Nafion™ N115 (thickness 127 µm) or Nafion™ N117 (thickness 183 µm) are used)) to reduce the level of hydrogen crossover but the concomitant increase in ionic resistance severely limits PEMWE performance.

It can be seen that there is a need for a high performance PEM which simultaneously limits hydrogen crossover to reduce the safety risk in these applications. By "high performance" is meant that the PEMWE can operate at as high a current density as possible, with as high an electrical efficiency (i.e. low cell voltage) as possible.

The present invention addresses this problem and in doing so provides a CCM which is useful in PEM water electrolyser applications.

DISCLOSURE OF THE INVENTION

A first aspect of the invention is a catalyst-coated membrane (CCM) for use in a water electrolyser, having a laminate structure comprising:
   a first layer comprising a first membrane component, the first membrane component having a cathode catalyst layer disposed on a first face thereof;
   a second layer comprising a second membrane component, the second membrane component having an anode catalyst layer disposed on a first face thereof; and
   an intermediate layer disposed between the first and second layers, comprising a third membrane component, the third membrane component having a recombination catalyst layer disposed on a first face thereof.

Such a CCM offers improved performance in a water electrolyser (due to low ionic resistance across the CCM) as well as reduced safety hazard due to reduced hydrogen crossover. Additionally, the CCM is of high quality (i.e. it can be produced with high reproducibility and consistency, and with minimal defects) and may be manufactured more efficiently. The reasons for this are as follows.

The use of a layer comprising a catalyst (a recombination catalyst) having the ability to catalytically react any excess hydrogen crossing over from the anode with oxygen from the cathode in a controlled manner to form water within a PEM fuel cell is known, for example, from US 2002/0058172 A1. The purpose of such layers in fuel cells is to help hydrate the membrane in order to maintain proton conductivity. This is necessary in fuel cells operating under some conditions because the input reactants are gaseous hydrogen and oxygen, and the amount of liquid water present is minimal.

In a PEMWE such techniques to keep the membrane hydrated are prima facie unnecessary because the input reactant is liquid water, which flows on each side of an electrolyser cell ensuring good hydration of the REM at all times. So, there would appear to be no need to incorporate an additional hydrating catalyst layer within the PEM of a water electrolyser.

Despite this, it has been found that the presence of a recombination catalyst layer within the PEM of a PEMWE leads to a significant reduction in hydrogen crossover through to the anode electrode side of the CCM. Therefore, use of the CCM of the present invention in a PEMWE provides lower resistance, higher performance and a reduced risk of an explosive mixture being formed on the anode side of the cell.

CCMs for use in fuel cells which incorporate a layer of recombination catalyst within the membrane (such as those described in US 2002/0058172 A1) are typically produced by coating a recombination catalyst layer onto one face of a membrane component, and laminating with a second membrane component, such that the recombination catalyst layer is sandwiched between the two membrane components. Anode and cathode catalyst layers are then typically applied to each of the opposing faces of the resulting membrane to form the CCM.

Such CCMs are problematic to produce and are typically of low quality. To produce such CCMs, a first thin membrane component supported on a backing layer is coated on its exposed face with a recombination catalyst. This first membrane component is then laminated with a second membrane component also supported on a backing layer to provide a laminated membrane (the two membrane components being arranged so the recombination catalyst is sandwiched between the two membrane components). One of the backing layers is removed and a catalyst layer (either anode or cathode) is applied to the exposed face of the laminated membrane. The second backing layer is then removed and a second catalyst layer (either cathode or anode) is applied to the second face of the laminated membrane. This is not trivial and leads to quality control issues, because when a coated thin membrane is removed from the supporting carrier film to coat the other face, inevitable distortion of the membrane makes further coating on the opposite face very difficult. The result is that for any further coating added to the membrane the loading of platinum group metal catalyst on the membrane is difficult to control. The coating must be performed slowly which reduces the efficiency of production.

Furthermore, the coating is often achieved by a thermal transfer step of a catalyst layer, formed on a carrier film, to the membranes, which causes distortion of thin membranes.

By contrast, the CCM according to the invention may be produced by the direct coating of a catalyst layer onto a single face of each of the first, second and third membrane components, followed by lamination of the three catalysed membrane components without any further coating steps to provide the CCM of the invention. As a result, quality control issues arising from applying a second catalyst coating onto the opposite face of a given membrane component do not arise and a very high quality CCM can be produced.

Since each membrane component is coated on only one face and membrane distortion is minimised, very thin membrane components may be used, thereby reducing the ionic resistance across the final CCM and improving performance. At the same time, the presence of the recombination catalyst layer reduces the hydrogen crossover which would otherwise be present for a thin CCM and explosion risk during use is minimised.

So, it can be seen that the CCM of the invention is of high quality, can be efficiently produced and has improved properties, including reduced ionic resistance, more efficient operation of the electrolyser, and reduced risk of hydrogen crossover.

A second aspect of the invention is the use of the catalyst-coated membrane according to the first aspect as a CCM within a water electrolyser.

Such use of the CCM according to the first aspect provides a v pater electrolyser of improved performance and improved safety.

A third aspect of the invention is a method of making a catalyst-coated membrane comprising:

providing a first membrane component, said first membrane component having a cathode catalyst layer disposed on a first face of the first membrane component;

providing a second membrane component, said second membrane component having an anode catalyst layer disposed on a first face of the second membrane component;

providing a third membrane component, said third membrane component having a recombination catalyst layer disposed on a first face third membrane component; and laminating the first, second and third membrane components together to form a catalyst-coated membrane having a laminate structure, such that the third membrane component is disposed between the first and second membrane components within the laminate structure.

In this way, a CCM as described above under the first aspect may be produced. In particular, the provision of three independently coated membrane components which are subsequently laminated together in the method of the third aspect allows the catalyst loading to be more closely controlled, allows for the use of thinner membrane components and improves the efficiency of the production process. The recombination catalyst on the third membrane component reduces hydrogen crossover across the CCM.

A fourth aspect of the invention is a catalyst-coated membrane, obtained by a method according to the third aspect. Due to the provision of three membrane components each independently carrying catalysts such a CCM is of higher quality, for the reasons explained above. A fourth aspect of the invention is a catalyst-coated membrane, obtainable by a method according to the third aspect.

A fifth aspect of the invention is a water electrolyser comprising the catalyst-coated membrane according to the first aspect.

A sixth aspect of the invention is a method of generating hydrogen gas comprising the steps of electrolysing water using a water electrolyser according to the fifth aspect, and generating hydrogen gas.

Any sub-titles herein are included for convenience only, and are not to be construed as limiting the disclosure in any way.

Further Options and Preferences

Catalyst-Coated Membrane

The CCM of the invention has a laminate structure, i.e. it is built up from an assembly of multiple individual layers, namely the first layer, the second layer and the intermediate layer. Each of these layers comprises a membrane component each having a catalyst layer disposed on a first face thereof. In some embodiments, each of the three membrane components has the catalyst layer disposed on a first face but does not have any catalyst layer or other additive disposed on the second (i.e., the other) face.

In some embodiments, the CCM is for use in a water electrolyser.

In some embodiments, the first and second layers are each adjacent the intermediate layer, positioned on each of the opposing faces of the intermediate layer. By "adjacent the intermediate layer" is meant that the first and second layers are in contact with the intermediate layer within the laminate structure, with no other layers being present between the intermediate layer and the first and second layers, respectively.

In some embodiments, the CCM consists of the first layer, the second layer and the intermediate layer. Thus, in some embodiments, the CCM has a three-layer structure in which the outer layers are the first and second layers and the inner layer is the intermediate layer, with no further layers being present.

Nevertheless, it is envisaged that additional layers may be present within the CCM laminate structure, provided that the properties of the CCM are not jeopardised by the presence of such layers.

In some embodiments, the second faces of the first and second membrane components face the intermediate layer. In other words, the first and second membrane components may be oriented such that the catalyst layers disposed on their first faces are not in contact with the intermediate layer (i.e. the second faces of each of the first and second membrane components are in contact with the intermediate layer).

In some embodiments, the CCM has a three-layer structure in which the outer layers are the first and second layers and the inner layer is the intermediate layer, the second face of the first layer and the second face of the second layer each facing inwards, towards the intermediate layer.

In this manner, a CCM is provided which is ready to be incorporated into an electrolyser by the addition of current collector layers to either side.

In some embodiments, the distance between the recombination catalyst layer of the intermediate layer and the cathode catalyst layer of the first layer within the overall CCM of the invention is larger than the distance between the recombination catalyst layer of the intermediate layer and the anode catalyst layer of the second layer. Herein, "distance" refers to the distance as measured across the CCM thickness from the centre of one catalyst layer to the centre of an adjacent catalyst layer.

In this way, in use, the recombination catalyst layer of the intermediate layer within the CCM lies closer to the anode catalyst layer than the cathode catalyst layer. This is beneficial because hydrogen has a higher rate of diffusion through the PEM than oxygen, so that the relative amounts of hydrogen and oxygen necessary for efficient recombination will be present at a plane within the CCM closer to the anode catalyst layer than the cathode catalyst layer. So, the recombination of $H_2$ and $O_2$ is more efficient when the location of the recombination catalyst is properly selected to be at or near this plane.

In some embodiments, the distance between the recombination catalyst layer and the cathode catalyst layer within the CCM is at least 1.5 times larger than the distance between the recombination catalyst layer and the anode catalyst layer, for example at least 1.6 times, at least 1.7 times, at least 1.8 times, or at least 1.9 times. In some embodiments the distance between the recombination catalyst layer and the cathode catalyst layer within the CCM is 2.0 times the distance between the recombination catalyst layer and the anode catalyst layer.

When three membrane components of equal thickness are used in the preparation of the laminate, this positioning of the recombination catalyst layer may be achieved by setting the orientation of the intermediate layer within the CCM.

Additionally, or alternatively, this positioning of the recombination catalyst layer of the intermediate layer can be achieved by adjusting the relative thicknesses of the three membrane components.

In some embodiments, a second face of the third membrane component is adjacent a second face of the first membrane component, such that the recombination catalyst layer is disposed adjacent the second layer.

In other words, the intermediate layer may be oriented such that the recombination catalyst layer within the laminate structure is closer to the second membrane component carrying the anode catalyst layer than the first membrane component carrying the cathode catalyst layer.

In this way, the recombination catalyst layer may be placed at a position closer to the anode catalyst layer by adjusting the orientation of the third membrane component, for the reasons discussed above.

In some embodiments, the total thickness of the catalyst-coated membrane of the invention is ≤120 μm (i.e. no more than 120 μm), for example ≤100 μm, for example ≤95 μm, no ≤90 μm, ≤85 μm, ≤80 μm, ≤75 μm, ≤70 μm, ≤65 μm or ≤60 μm.

In this way, very low resistance to the transport of ions across the CCM is achieved, while hydrogen crossover is nonetheless prevented by the presence of the recombination catalyst. In other words, a very safe, high performance CCM is provided.

In some embodiments, the total thickness of the catalyst-coated membrane is at least 20 μm, for example at least 25 μm, at least 30 μm, at least 35 μm, at least 40 μm or at least 50 μm. In this way, the CCM is not so thin as to risk hydrogen crossover levels increasing despite the presence of the recombination catalyst layer.

In some embodiments, the total thickness of the catalyst-coated membrane is from 20 to 120, for example 25 to 100 μm, 30 to 90 μm, 35 to 85 μm, 40 to 80 μm, 45 to 75 μm. In some embodiments, the total thickness of the catalyst-coated membrane is about 60 μm.

In some embodiments, the total thickness of the catalyst-coated membrane is in the range 50 to 70 μm, for example 55 to 65 μm.

In some embodiments, a catalyst-coated membrane is provided which is a laminate consisting of the following layers, in order:
(a) a cathode catalyst layer comprising a cathode catalyst;
(b) a first membrane component;
(c) a third membrane component;
(d) a recombination catalyst layer comprising a recombination catalyst;
(e) a second membrane component; and
(f) an anode catalyst layer comprising an anode catalyst.

First, Second and Third Membrane Components

In some embodiments, one or more of the first, second and third membrane components comprise an ionomer. In some embodiments, each of the first, second and third membrane components comprise an ionomer.

In some embodiments, one or more of the first, second and third membrane components are solid polymer electrolyte membrane components comprising an ionomer. In some embodiments, each of the first, second and third membrane components are solid polymer electrolyte membrane components comprising an ionomer.

In some embodiments, the ionomer is a sulfonated fluoropolymer, such as a perfluorinated sulphonic acid (PFSA) ionomer, or partially fluorinated polymer. Such polymers perform well in an electrolyser. In some embodiments, the sulfonated fluoropolymer is a PFSA selected from e.g. Nafion™ (Chemours Company), Aquivion® (Solvay Specialty Polymers), Flemion™ (Asahi Glass Group) and Aciplex™ (Asahi Kasei Chemicals Corp).

In some embodiments, the ionomer is a sulphonated hydrocarbon ionomer, such as those available from FuMA-Tech GmbH as the Fumapem® P, E or K series of products, JSR Corporation, Toyobo Corporation, and others.

In some embodiments, one or more of the first, second and third membrane components comprise a mixture of ionomers, for example a mixture of a PFSA ionomer and a sulphonated hydrocarbon ionomer or a mixture of two or more PFSA ionomers of differing equivalent weight (EW).

In some embodiments, each of the first, second and third membrane components comprise the same ionomer or mixture of ionomers.

In some embodiments, one or more of the first, second and third membrane components comprises an ionomer composition different to the other membrane components. For example, the first and third membrane components comprise a PFSA of different equivalent weights (EW).

In some embodiments, one or more of the first, second or third membrane components comprises a reinforcing component embedded into the membrane component. In some embodiments, each of the first, second and third membrane components comprises such a reinforcing component.

The reinforcing component may comprise one or more planar reinforcing components which provide structural support for the membrane component, thereby increasing the mechanical strength, and allowing a thinner membrane component to be used.

The reinforcing component may comprise any suitable material which provides structural support without interfering with the ion transport properties of the CCM. Suitable planar reinforcing components include, but are not limited to, those formed from nanofibre structures (for example formed by electrospinning or force spinning), those formed from expanded polymer networks (e.g. expanded PTFE (e-PTFE)) and those formed by engineering of a planar non-porous structure. Examples of materials suitable for use in forming the planar reinforcing component are typically polymeric and include polytetrafluoroethylene (PTFE), polyvinylidene difluoride (PVDF), polyetherether ketone (PEEK), polyimide (PI), polyetherimide, polybenzimidazole (PBI), polyethersulphone (RES), polyaramid and polypropylene (PP) or mixtures or blends thereof.

In some embodiments, the reinforcing layer comprises e-PTFE. Usually, such a reinforcing layer is introduced into the membrane component during manufacture, by first casting a layer of ionomer onto a backing sheet from a liquid disperion, applying a reinforcing component such as e-PTFE onto the wet ionomer layer, and casting a further layer of ionomer to form the finished membrane component, thus forming a membrane component with an integral e-PTFE reinforcement.

In some embodiments, one or more of the first, second and third membrane components comprises a hydrogen peroxide removal additive, such as a hydrogen peroxide decomposition catalyst, or a peroxy radical scavenger additive. In some embodiments, each of the first, second and third membrane components comprises a hydrogen peroxide removal additive or a peroxy radical scavenger additive.

A common problem during the operation of water electrolysers is that the hydrogen and oxygen undergo an unwanted side-reaction to form hydrogen peroxide ($H_2O_2$), which in turn decomposes to form peroxide radicals. These radicals are highly reactive and attack the membrane components and other structures within the electrolyser, reducing the lifespan of the device.

The incorporation of a hydrogen peroxide removal additive, or a peroxy radical scavenger additive within one or more of the membrane components serves to eliminate these peroxide radicals, for example by decomposing the hydrogen peroxide into benign products or by scavenging radicals after their formation, thereby protecting the membrane components from degradation and increasing the lifespan of the device.

The peroxide removal additive may be one or more selected from the group consisting of hydrogen peroxide decomposition catalysts, radical scavengers, free radical decomposition catalyst, self-regenerating antioxidant, hydrogen donor (H-donor) primary antioxidant, free radical scavenger secondary antioxidant, and oxygen absorbers (oxygen scavenger). Examples of these different additives may be found in WO2009/040571 and WO2009/109780. In some embodiments, the additive is a hydrogen peroxide decomposition catalyst, such as cerium dioxide (ceria).

In some embodiments, the hydrogen peroxide removal additive or peroxy radical scavenger additive is dispersed through the bulk of one of more of the first, second and third membrane components, for example as a colloid dispersion. The peroxide removal additive may be uniformly distributed throughout the membrane component.

In some embodiments, one or more of the first, second and third membrane components comprise other optional additives known to the skilled person. For example, one or more of the first, second and third membrane components may comprise a graphene layer, such as described in WO2014/009721. Graphene acts as a physical barrier to hydrogen crossover, and its presence therefore reduces hydrogen crossover through the CCM even further.

Such membrane components are commercially available or may be prepared by methods well known to those skilled in the art. For example, the membrane components may be prepared by sequentially casting one or more layers from an ionomer dispersion in a solvent mix that may typically be a mixture of water and alcohols to form a membrane component. Each layer is dried prior to any subsequent deposition to form additional layers. If the membrane component is to be reinforced, a reinforcing component is applied to one or more of the wet layers prior to drying and/or the polymer dispersion is applied to a reinforcing component, thereby impregnating the pores of the reinforcing component; other methods of providing a reinforced membrane component are known to those skilled in the art. The casting of the ionomer dispersion is carried out by any suitable technique known to those in the art, including gravure coating, slot die (slot, extrusion) coating (whereby the coating is squeezed out under pressure via a slot onto the temporary carrier component), screen printing, rotary screen printing, inkjet printing, spraying, painting, bar coating, pad coating, gap coating techniques such as knife or doctor blade over roll (whereby the coating is applied to the temporary carrier component then passes through a slit between the knife and a support roller), and metering rod application such as with a Meyer bar to provide a wet layer.

In some embodiments, the first face of the first membrane component is coated with the cathode catalyst layer and the second face of the first membrane component is uncoated. In some embodiments, the first face of the second membrane component is coated with the anode catalyst layer and the second face of the second membrane component is uncoated. In some embodiments, the first face of the third membrane component is coated with the recombination catalyst layer and the second face of the third membrane component is uncoated. The phrase "catalyst-coated membrane component" is used to collectively refer to the membrane component and the catalyst layer coated on that membrane component.

In some embodiments, one or more of the first, second and third catalyst-coated membrane components has a thickness of ≤50 µm, for example ≤45 µm, ≤40 µm, ≤35 µm, ≤30 µm, ≤25 µm or ≤20 µm (provided the total combined thickness is ≤120 µm. In some embodiments, each of the first, second and third catalyst-coated membrane components have a thickness of ≤40 µm, for example ≤35 µm, ≤30 µm, ≤25 µm or ≤20 µm.

In some embodiments, one or more of the first, second and third catalyst-coated membrane components has a thickness of ≥7 µm for example ≥10 µm, ≥12 µm, ≥14 µm or ≥16 µm. In some embodiments, each of the first, second and third catalyst-coated membrane components has a thickness of ≥10 µm, for example ≥11 µm, ≥12 µm, ≥13 µm, ≥14 µm, ≥15 µm or ≥16 µm.

In some embodiments, the thickness of one or more of the first, second and third catalyst-coated membrane components is from 7 to 40, 10 to 35 µm, 12 to 30 µm, 14 to 25 µm or 16 to 20 µm. In some embodiments, the thickness of each of the first, second and third catalyst-coated membrane components is from 10 to 40 µm, for example 11 to 35 µm, 12 to 30 µm, 13 to 25 µm, 14 to 20 µm, 15 to 20 µm or 16 to 20 µm.

In some embodiments, the thickness of each of the first, second and third catalyst-coated membrane components is about 20 µm.

In some embodiments, the thicknesses of the first, second and third catalyst-coated membrane components are approximately equal. In some embodiments, the first, second and third catalyst-coated membrane components are of the same thickness.

In some embodiments, the thickness of first, second and third catalyst-coated membrane components are different to one or more of the other catalyst-coated membrane components. For example, the anode side catalyst-coated membrane component ay be thinner than the remaining two catalyst-coated membrane components.

Cathode Catalyst Layer

The cathode catalyst layer comprises one or more cathode catalyst materials that are suitable for catalysing the hydrogen evolution reaction.

The cathode catalyst material comprises one or more electrocatalysts. The one or more electrocatalysts are independently a finely divided unsupported metal powder, or a supported catalyst wherein small nanoparticles of metal are dispersed on high surface area electrically conducting support, such as carbon black supports. The metal is suitably selected from:
(i) the platinum group metals (platinum, palladium, rhodium, ruthenium, iridium and osmium),
(ii) gold or silver,
a base metal,
or an alloy or mixture comprising one or more of these metals or heir oxides.

In some embodiments, the metal is platinum, which may be alloyed with other precious metals or base metals. If the electrocatalyst is a supported catalyst, the loading of metal nanoparticles on the carbon support material is suitably in the range 10-90 wt %, preferably 15-75 wt % of the weight of resulting electrocatalyst.

In some embodiments, the cathode catalyst comprises unsupported platinum black or platinum supported on carbon.

The cathode catalyst layer may comprise additional components. Such components include, but are not limited to: an ion-conducting polymer, such as a proton conducting polymer, included to improve the ionic conductivity within the layer; a hydrogen peroxide decomposition catalyst; a polymeric binder additive, such as polytetrafluoroethylene (PTFE); an inorganic solid with or without surface treatment to control reactant and product transport characteristics. The choice of additional components is within the capability of the skilled person to determine which additional components are appropriate.

To prepare the cathode catalyst layer, the cathode catalyst material and any additional components are dispersed in an aqueous and/or organic solvent to prepare a catalyst ink. If required, agglomerate particle break-up is carried out by methods known in the art, such as high shear mixing, milling, ball milling, passing through a microfluidiser etc. or a combination thereof, to achieve uniformity of particle size.

After preparation of the catalyst ink, the ink is deposited directly onto the first membrane component to form the cathode catalyst layer. Alternatively, the ink is deposited on a transfer/carrier substrate to form a cathode catalyst layer which is then transferred to the first membrane component using a decal transfer method (such methods are known to those skilled in the art). The ink may be deposited onto the first membrane component or transfer/carrier substrate by any suitable technique known to those in the art, including but not limited to gravure coating, slot die (slot, extrusion) coating, screen printing, rotary screen printing, inkjet printing, spraying, painting, bar coating, pad coating, gap coating techniques such as knife or doctor blade over roll, and metering rod application.

In some embodiments, the cathode catalyst layer is applied to the first membrane component to a loading of at least 0.10 mg of precious metal per $cm^2$ (e.g. mg Pt $cm^{-2}$), for example at least 0.15 mg of precious metal per $cm^2$, for example at least 0.20 mg of precious metal per $cm^2$, at least 0.25 mg of precious metal per $cm^2$, at least 0.30 mg of precious metal per $cm^2$, at least 0.35 mg of precious metal per $cm^2$ or at least 0.40 mg of precious metal per $cm^2$.

In some embodiments, the cathode catalyst layer is applied to the first membrane component to a loading of up to 4.0 mg of precious metal per $cm^2$ (e.g. mg Pt $cm^{-2}$), for example up to 2.0 mg of precious metal per $cm^2$, up to 1.0 mg of precious metal per $cm^2$, up to 0.75 mg of precious metal per $cm^2$ or up to 0.4 mg of precious metal per $cm^2$.

In some embodiments, the cathode catalyst loading on the first membrane component is in the range 0.10 to 4.0 mg of precious metal per $cm^2$, for example 0.2 to 2.0 mg of precious metal per $cm^2$, for example 0.25 to 1.0 mg of precious metal per $cm^2$, for example 0.30 to 0.90 mg of precious metal per $cm^2$, for example 0.35 to 0.90 mg of precious metal per $cm^2$, for example 0.40 to 0.8 mg of precious metal per $cm^2$.

Anode Catalyst Layer

The anode catalyst layer comprises one of more anode catalyst materials which are suitable for catalysing the oxygen evolution reaction.

In some embodiments, the anode catalyst material comprises unsupported iridium oxide (also known as a "black"), alloys or mixed metal oxides (mixed crystal) or mixtures of oxides of iridium and/or ruthenium black, alloys mixed metal oxides (mixed crystal) or mixtures of oxides of iridium and/or ruthenium black with an additional metal or oxide (for example, tantalum, niobium, titanium), iridium on a support or iridium and/or ruthenium alloys or mixed metal oxides (mixed crystal) or mixtures of oxides of iridium and/or ruthenium with an additional metal or oxide on a support. In some embodiments, the support is selected from antimony-doped tin oxide and niobium-doped titania.

The anode catalyst layer may comprise additional components. Such components include, but are not limited to; an ion-conducting polymer, such as a proton conducting polymer, included to improve the ionic conductivity within the layer; a hydrogen peroxide decomposition catalyst; a polymeric binder additive, such as polytetrafluoroethylene (PTFE); an inorganic solid with or without surface treatment to control reactant and product transport characteristics. The choice of additional components is within the capability of the skilled person to determine which additional components are appropriate.

To prepare the anode catalyst layer, the anode catalyst material and any additional components are dispersed in an aqueous and/or organic solvent to prepare a catalyst ink.

If required, agglomerate particle break-up is carried out by methods known in the art, such as high shear mixing, milling, ball milling, passing through a microfluidiser etc. or a combination thereof, to achieve uniformity of particle size.

After preparation of the catalyst ink, the ink is deposited directly onto the second membrane component to form the anode catalyst layer. Alternatively, the ink is deposited on a transfer/carrier substrate to form an anode catalyst layer which is then transferred to the second membrane component using a decal transfer method (such methods are known to those skilled in the art). The ink may be deposited onto the second membrane component or transfer/carrier substrate by any suitable technique known to those in the art, including but not limited to gravure coating, slot die (slot, extrusion) coating, screen printing, rotary screen printing, inkjet printing, spraying, painting, bar coating, pad coating, gap coating techniques such as knife or doctor blade over roll, and metering rod application.

In some embodiments, the anode catalyst layer is applied to the second membrane component to a loading of at least 0.4 mg of precious metal per $cm^2$ (e.g. mg Ir $cm^{-2}$), for example at least 0.5 mg of precious metal per $cm^2$, at least 0.6 mg of precious metal per $cm^2$, at least 0.7 mg of precious metal per $cm^2$, at least 0.8 mg of precious metal per $cm^2$ or at least 0.9 mg of precious metal per $cm^2$.

In some embodiments, the anode catalyst layer is applied to the second membrane component to a loading of up to 4.0 mg of precious metal per $cm^2$ (e.g. mg Ir $cm^{-2}$), for example up to 3.0 mg of precious metal per $cm^2$, up to 2.0 mg of precious metal per $cm^2$, up to 1.75 mg of precious metal per $cm^2$ or up to 1.5 mg of precious metal per $cm^2$.

In some embodiments, the anode catalyst layer loading on the second membrane component is in the range 0.40 to 4.0 mg of precious metal per $cm^2$, for example 0.50 to 2.00 mg of precious metal per $cm^2$, for example 0.60 to 1.90 mg of precious metal per $cm^2$, for example 0.65 to 1.85 mg of precious metal per $cm^2$, for example 0.70 to 1.80 mg of precious metal per $cm^2$, for example 0.80 to 1.60 mg of precious metal per $cm^2$.

In some embodiments, the anode catalyst layer loading on the second membrane component is in the range 0.6 to 1.2 mg of precious metal per $cm^2$ Recombination Catalyst Layer The recombination catalyst layer comprises one or more recombination catalyst materials.

The recombination catalyst material is not particularly limited, and may be selected from any suitable catalyst which catalyses the recombination of $H_2$ and $O_2$ to form water.

For example, the recombination catalyst material comprises a metal (such as platinum or palladium) on a high surface area support material (such as carbon, silica, titanic, zirconia). More examples of recombination catalyst materials are disclosed in EP0631337 and WO00/24074.

For example, the recombination catalyst material comprises unsupported metal particles, (such as platinum or palladium or alloys or mixed oxides of platinum and palladium with other metals such as cerium and titanium)

In some embodiments, the recombination catalyst comprises palladium supported on carbon, platinum supported on carbon, rhodium supported on carbon or a platinum group metal (PGM) (platinum, palladium, iridium, rhodium, ruthenium, osmium) supported on silica.

The recombination catalyst layer may comprise additional components. Such components include, but are not limited to: an ion-conducting polymer, such as a proton conducting polymer, included to improve the ionic conductivity within the layer; a hydrogen peroxide decomposition catalyst; a polymeric binder additive, such as polytetrafluoroethylene (PTFE); an inorganic solid with or without surface treatment to control reactant and product transport characteristics. The choice of additional components is within the capability of the skilled person to determine which additional components are appropriate.

To prepare the recombination catalyst layer, the recombination catalyst material and any additional components are dispersed in an aqueous and/or organic solvent to prepare a catalyst ink. If required, agglomerate particle break-up is carried out by methods known in the art, such as high shear mixing, milling, ball milling, passing through a microfluidiser etc. or a combination thereof, to achieve uniformity of particle size.

After preparation of the catalyst ink, the ink is deposited directly onto the third membrane component to form the recombination catalyst layer. Alternatively, the ink is deposited on a transfer/carrier substrate to form a catalyst layer which is then transferred to the third membrane component using a decal transfer method (such methods are known to those skilled in the art). The ink may be deposited onto the third membrane component or transfer/carrier substrate by any suitable technique known to those in the art, including but not limited to gravure coating, slot die (slot, extrusion) coating, screen printing, rotary screen printing, inkjet printing, spraying, painting, bar coating, pad coating, gap coating techniques such as knife or doctor blade over roll, and metering rod application.

In some embodiments, the recombination catalyst is applied to the third membrane component to a loading of at least 0.010 mg of precious metal per $cm^2$ (e.g. mg Pd $cm^{-2}$), for example at least 0.015 mg of precious metal per $cm^2$, at least 0.020 mg of precious metal per $cm^2$, at least 0.025 mg of precious metal per $cm^2$, at least 0.030 mg of precious metal per $cm^2$ or at least 0.035 mg of precious metal per $cm^2$.

In some embodiments, the recombination catalyst is applied to the third membrane component to a loading of up to 0.100 mg of precious metal per $cm^2$ (e.g. mg Pd $cm^{-2}$), for example up to 0.095 mg of precious metal per $cm^2$, up to 0.090 mg of precious metal per $cm^2$, up to 0.085 mg of precious metal per $cm^2$, up to 0.080 mg of precious metal per $cm^2$ or up to 0.075 mg of precious metal per $cm^2$.

In some embodiments, the recombination catalyst loading on the third membrane component is in the range 0.02 to 0.10 mg of precious metal per $cm^2$, for example 0.025 to 0.09 mg of precious metal per $cm^2$, for example 0.030 to 0.085 mg of precious metal per $cm^2$, for example 0.035 to 0.080 mg of precious metal per $cm^2$, for example 0.04 to 0.08 mg of precious metal per $cm^2$.

Use of the CCM

In some embodiments, the use of the CCM is within a water electrolyser.

In some embodiments, the use of the recombination catalyst within the CCM enables an overall thinner CCM to be used, whilst still minimising hydrogen crossover within a water electrolyser.

In some embodiments, the use of the recombination catalyst within the CCM is to simultaneously minimise hydrogen crossover while reducing ionic resistance within a water electrolyser.

In some embodiments, the use of the recombination catalyst within the CCM is to improve the safety risk associated with the operation of a water electrolyser.

Providing the First, Second and Third Membranes

In some embodiments, the steps of "providing a first membrane component having a cathode catalyst layer disposed on a first face thereof", "providing a second membrane component having an anode catalyst layer disposed on a first face thereof", and "providing a third membrane component having a recombination catalyst layer disposed on a first face thereof" are each achieved by direct coating of the catalyst layers onto the membrane components. In some embodiments, the catalyst layers are directly coated onto the membrane components while each membrane component is attached to a supporting carrier film, the respective carrier films being removed from the membrane components after coating and before lamination.

In this way, the membrane component is supported on its respective carrier films during the addition of the catalyst layer, preventing or reducing distortion of the membrane component caused by the addition of the catalyst layer.

Moreover, the membrane components are protected by their backing sheets during the addition of each of the three catalyst layers, and may then be laminated immediately after removal of the backing sheets, which contrasts with known methods in which one or more of the catalyst layers are added after backing sheets have been removed, risking damage to the membrane component and making quality control of the second coating very difficult.

The backing sheets assist in holding the membrane component in position for the addition of the catalyst layer. In some embodiments, each membrane component is held in position by its backing sheet during the addition of the catalyst layer. In some embodiments, the membrane component is held by a heated vacuum bed.

Methods for applying each catalyst layer onto its respective membrane component have been described hereinbefore.

In some embodiments, after the catalyst layers have been deposited onto each membrane component, the backing sheets are removed from each membrane component and the lamination step is performed.

In some embodiments, after removal of the backing sheets lamination is performed without any intervening processing steps, such as coating of the membrane components. In this way the dimensional stability of the membrane components is improved since coating on both faces of a membrane component can cause distortion and reduce the quality of the final laminated product.

In some embodiments, the coating of the first, second and third membrane components with their respective catalysts is performed simultaneously and followed by a single hot lamination step to consolidate the membrane components. In this way a highly energy-efficient and cost-efficient production process is provided. By contrast, known production methods include multiple consecutive coating steps (for example, a first coating step to apply a recombination catalyst to one face of a membrane component followed by a second coating step to apply an anode or cathode catalyst to the other face of the same membrane component) and transfer steps, which reduces the throughput of the process and limits the efficiency.

In some embodiments, after a membrane component has been coated with a catalyst it is subjected to a drying step to dry the catalyst, for example infra-red (IR)-drying.

Lamination of the First, Second and Third Membranes

In some embodiments, the first, second and third membrane components are laminated together in a single lamination step.

In this way, a highly efficient production process is provided since only one hot lamination step is required. The process is efficient both in time and in energy usage.

In some embodiments, the membrane components are arranged such that the second faces of the first and second membrane components face the third membrane component.

In this way, as discussed above, a CCM is provided which may be incorporated into an electrolyser.

In some embodiments, the membrane components are arranged such that the first face of the third membrane component faces the second membrane component.

In this way, the recombination catalyst layer is positioned closer to the anode catalyst layer during the lamination, such that the recombination catalyst layer is positioned closer to the anode catalyst layer in the laminated CCM, providing the advantages discussed above.

In some embodiments, the lamination is carried out by layering the catalyst-coated membrane components in the necessary arrangement followed by subjecting the arrangement of layers to heat and/or pressure to consolidate them into the laminate structure.

In some embodiments, the lamination is carried out by heat pressing. In some embodiments, the lamination is carried out at a temperature of at least 120° C., for example at least 130° C., at least 140° C. or at least 150° C. In some embodiments, the lamination is carried out at a temperature of up to 220° C., for example up to 200° C., up to 190° C., up to 180° C. or up to 170° C.

In some embodiments, the lamination is carried out at a pressure of at least 5000 kPa, for example at least 5100 kPa, at least 5200 kPa or at least 5300 kPa. In some embodiments, the lamination is carried out at a pressure of up to 6000 kPa, for example up to 5900 kPa, up to 5800 kPa or up to 5700 kPa.

In some embodiments, the layers are subjected to heat and/or pressure for at least 30 s, for example at least 40 s, at least 50 s, at least 60 s or at least 70 s. In some embodiments, the layers are subjected to heat and/or pressure for up to 5 mins, for example up to 4.5 mins, up to 4 mins, up to 3.5 mins, up to 3 mins or up to 2.5 mins.

In this way a CCM may be provided with layers which are properly adhered together without being damaged or experiencing detrimental effects on the CCM or membrane component properties.

In some embodiments the lamination process further comprises a step of coating a layer comprising a peroxide removal additive onto one or more of the first, second and third membranes components. Preferably the coating of peroxide removal additive occurs before coating of catalyst layers.

In some embodiments, the CCM is prepared in a continuous roll-to-roll process, wherein first, second and third rolls comprising respective first, second and third membrane components each coated with their respective catalyst layer are each unrolled in a first step, removed from their backing sheets in a second step and laminated together to form the CCM having laminate structure in a third step. Subsequently, in some embodiments the CCM having a laminate structure is itself formed into a fourth roll in a fourth step, hence the term "roll-to-roll" for such a manufacturing process.

Alternatively, first, second and third rolls of membrane component are provided and the catalyst layers coated onto the membrane components after unrolling of the first, second and third rolls and before lamination.

In some embodiments the process further comprises a step of coating a layer comprising a peroxide removal additive onto one or more of the first, second and third membranes components. This may occur before rolling into the first, second and third rolls or after unrolling of the first, second and third rolls but before lamination. Preferably the coating of peroxide removal additive occurs before coating of catalyst layers.

In some embodiments, the lamination step is performed under heat and/or pressure.

Such a process is very efficient since each of the three membranes are separately unrolled and coated in steps which may occur simultaneously, followed by lamination in a single step saving time and energy.

Water Electrolyser (PEMWE)

In some embodiments, the CCM of the invention will be assembled between anodic and cathodic current collectors and compressed between bipolar plates within a PEMWE stack. The anodic current collector can be chosen from any suitable porous metal plate such as titanium or stainless steel sinters, with or without coatings (such as precious metals or conducting oxides or nitrides) as appropriate for the operating conditions of interest. The cathodic current collector can either be a porous metal plate similar to the anodic current collector or a carbon based gas diffusion layer (GDL) as known to one skilled in the art. These current collectors are then placed between water distribution plates which may be machined or stamped flow fields or porous metal sheets or meshes. One or more of these assemblies are then placed between end plates which provide the fluid connections and compression to the whole system and this stack is then combined with the remaining balance of plant to form the PEMWE system.

Fuel Cell (PEMFC)

The invention is primarily directed to the use of the CCM of the invention in an electrolyser. However, a CCM with a similar laminated structure could also be of use in a membrane electrode assembly (MEA) of a fuel cell. The skilled person will be aware that the anode and cathode catalyst layers will be modified to take account of the different reactions taking place at these electrodes in a fuel cell compared to those electrodes in an electrolyser. It will also be within the capability of the skilled person to select the appropriate gas diffusion layers required to complete the fabrication of the fully integrated MEA.

FIGURES

FIG. 7 is a plot of hydrogen crossover against current density for three different electrolysers, two including state of the art CCMs and one including a CCM according to one embodiment of the invention.

DETAILED DESCRIPTION

Figure 1:
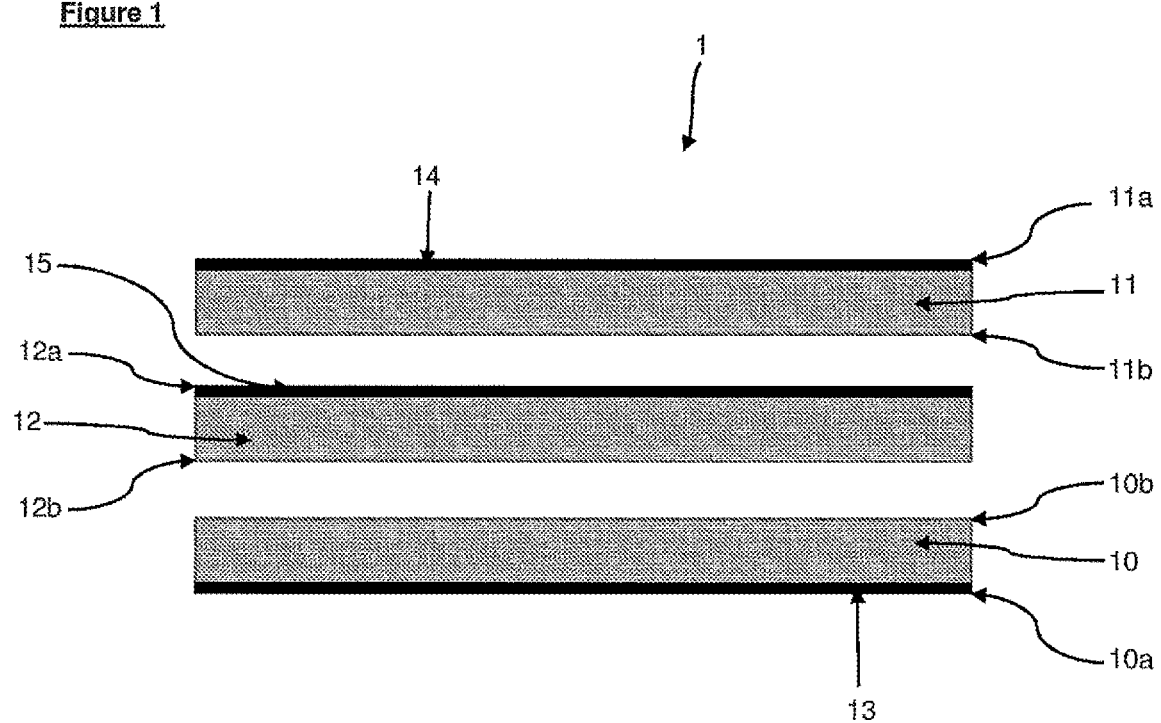
FIG. 1 shows an exploded schematic view of a CCM according to one embodiment of the invention.

FIG. 1 shows an exploded view of a CCM according to one embodiment of the invention. The CCM 1 consists of three individual catalyst-coated membrane components. A first membrane component 10 has a first face 10a and a second face 10b. A second membrane component 11 has a first face 11a and a second face 11b. A third membrane component 12 has a first face 12a and a second face 12b.

A cathode catalyst layer 13 is located adjacent the first face 10a of the first membrane component 10. In practice, this layer is applied to the first face 10a of the first membrane component 10. The first face 10a of the first membrane component 10 faces outwards, so that the cathode catalyst layer 13 is located on an external surface of the CCM.

An anode catalyst layer 14 is located adjacent the first face 11a of the second membrane component 11. In practice, this layer is applied to the first face 11a of the second membrane component 11. The first face 11a of the second membrane component 11 faces outwards, so that the anode catalyst layer 14 is located on an external surface of the CCM—the opposite surface to the cathode catalyst layer.

A recombination catalyst layer 15 is located adjacent the first face 12a of the third membrane component 12. In practice, this layer is applied to the first face 12a of the third membrane component 12. The recombination catalyst layer 15 is also located adjacent the second face 11b of the second membrane component 11. The recombination catalyst layer is therefore sandwiched between the second and third membrane components 11 and 12, and lies in a position which is closer to the anode catalyst layer than it is to the cathode catalyst layer.

Figure 2:
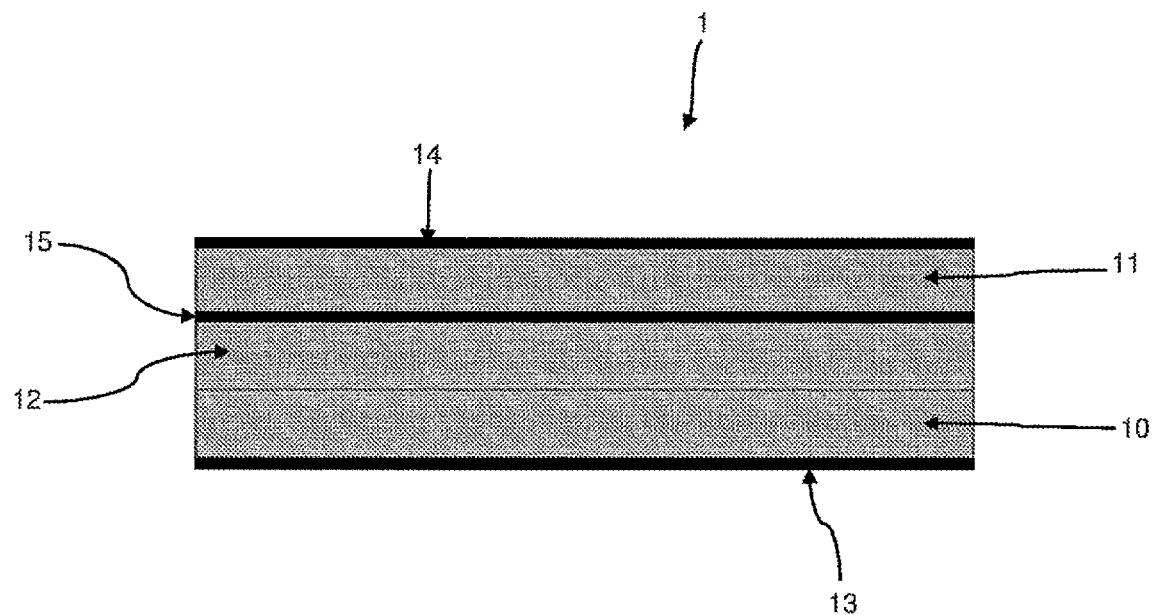
FIG. 2 shows a schematic sectional view of a CCM according to one embodiment of the invention after lamination.

FIG. 2 shows the same CCM as FIG. 1, assembled and in cross-section.

Figure 3:
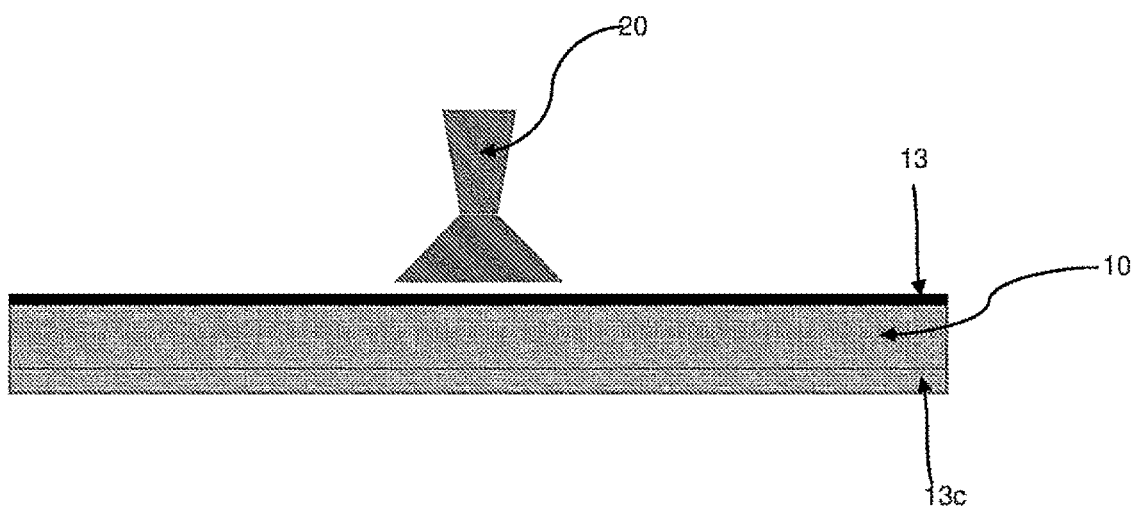
FIG. 3 shows a schematic sectional view of a membrane component being coated with a catalyst layer while in position on a backing sheet.

Each of the first, second and third membrane components 10, 11 and 12 are coated with their respective catalyst layer while fixed to a backing sheet. FIG. 3 shows a process by which the first membrane component 10 may be coated with a cathode catalyst layer 13 while positioned on its backing sheet 13c. The membrane component is held in place using a heated vacuum bed (not shown) and the catalyst layer is deposited using an ultrasonic spray coater. In FIG. 3 the ultrasonic spray coater is represented by nozzle 20. The same process as shown in FIG. 3 may be used to coat membrane components 11 and 12 with their respective catalyst layers.

Figure 4:
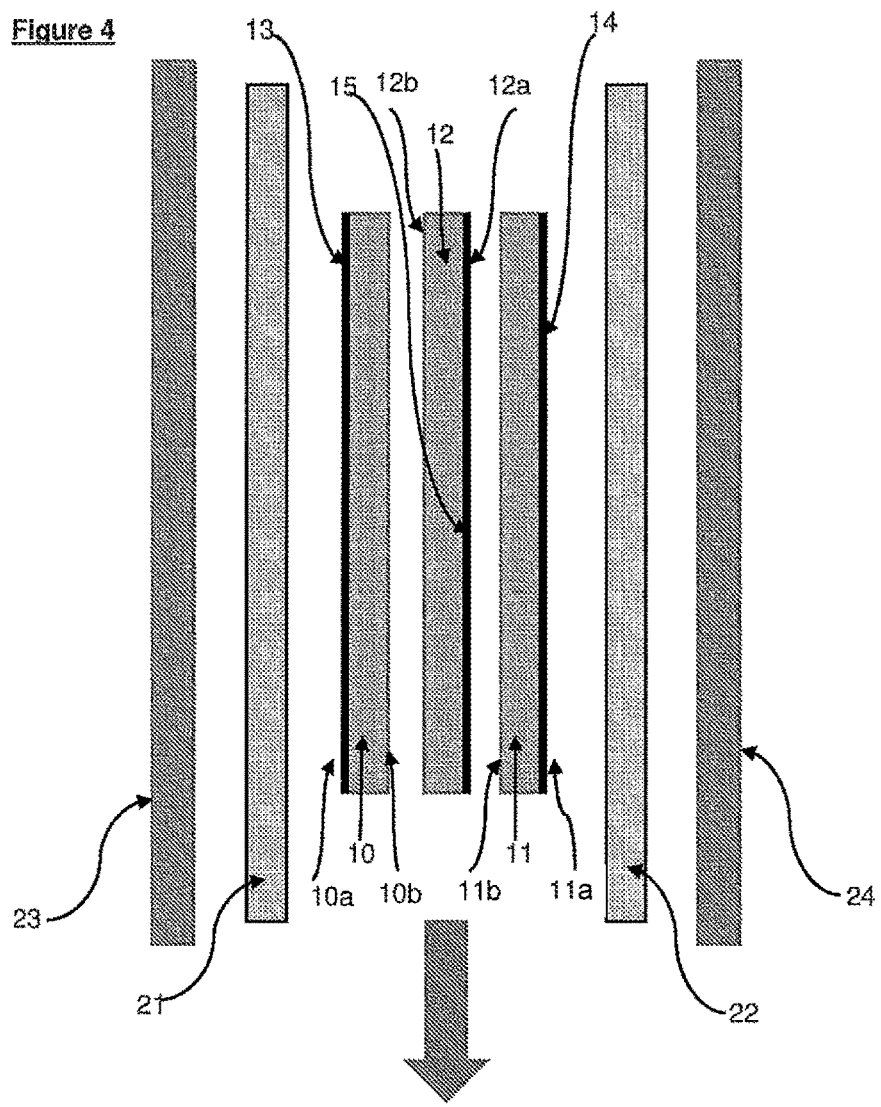
FIG. 4 shows a schematic discrete lamination process for producing a CCM according to one embodiment of the invention.
Figure 4:
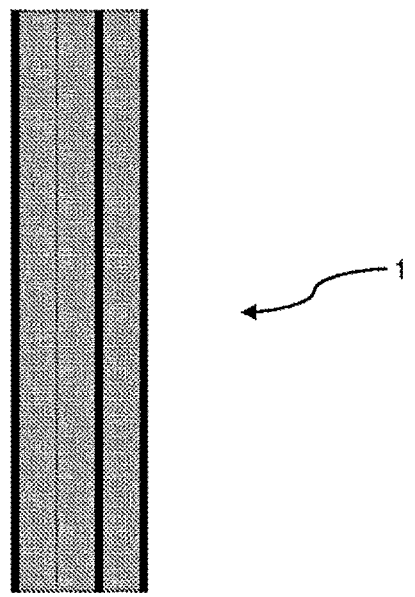

FIG. 4 demonstrates the process by which the CCM of the invention may be prepared, showing the individual membrane components 10, 11 and 12 in position ready for lamination after being coated with the catalyst layers 13, 14 and 15 respectively. As shown in FIG. 4, the first membrane component 10 is coated with cathode catalyst 13, the second membrane component 11 is coated with anode catalyst 14 and the third membrane component 12 is coated with recombination catalyst 15.

FIG. 4 shows a process for laminating the three coated membrane components 10, 11 and 12 to form a discrete CCM 1. After each membrane component 10, 11 and 12 has been coated with its catalyst layer, the backing sheets (not shown) are removed from each membrane component and the catalyst-coated membrane components are laid on top of one another in the correct order before being placed between two PTFE sheets 21, 22 and two titanium plates 23, 24 and pressed at temperature in a press pack. In the embodiment shown in FIG. 4, the central intermediate layer 12 is oriented such that the recombination catalyst layer 15 faces the second membrane component 11. This is because of the faster diffusion rate of $H_2$ relative to $O_2$ through the CCM. Orienting the membrane components in the manner shown means that, because the membrane components are of equal thickness, the recombination catalyst layer will be positioned closer to the anode catalyst layer in the final laminated CCM. As a result, the recombination catalyst layer will lie closer to the plane in which the levels of $H_2$ and $O_2$ are suitable for most effective recombination.

Shen the catalyst-coated membrane components have been properly arranged they are laminated by heat pressing between the PTFE sheets 21, 22 and titanium plates 23, 24 at e.g. 170° C. and 800 psi (approx. 5500 kPa) for 2 minutes to consolidate the catalyst-coated membrane components into the CCM 1 shown in cross-section in FIG. 2.

After the CCM has been prepared, suitable current collectors are positioned on each faces of the CCM to enable incorporation into a water electrolyser (PEMWE).

Figure 5:
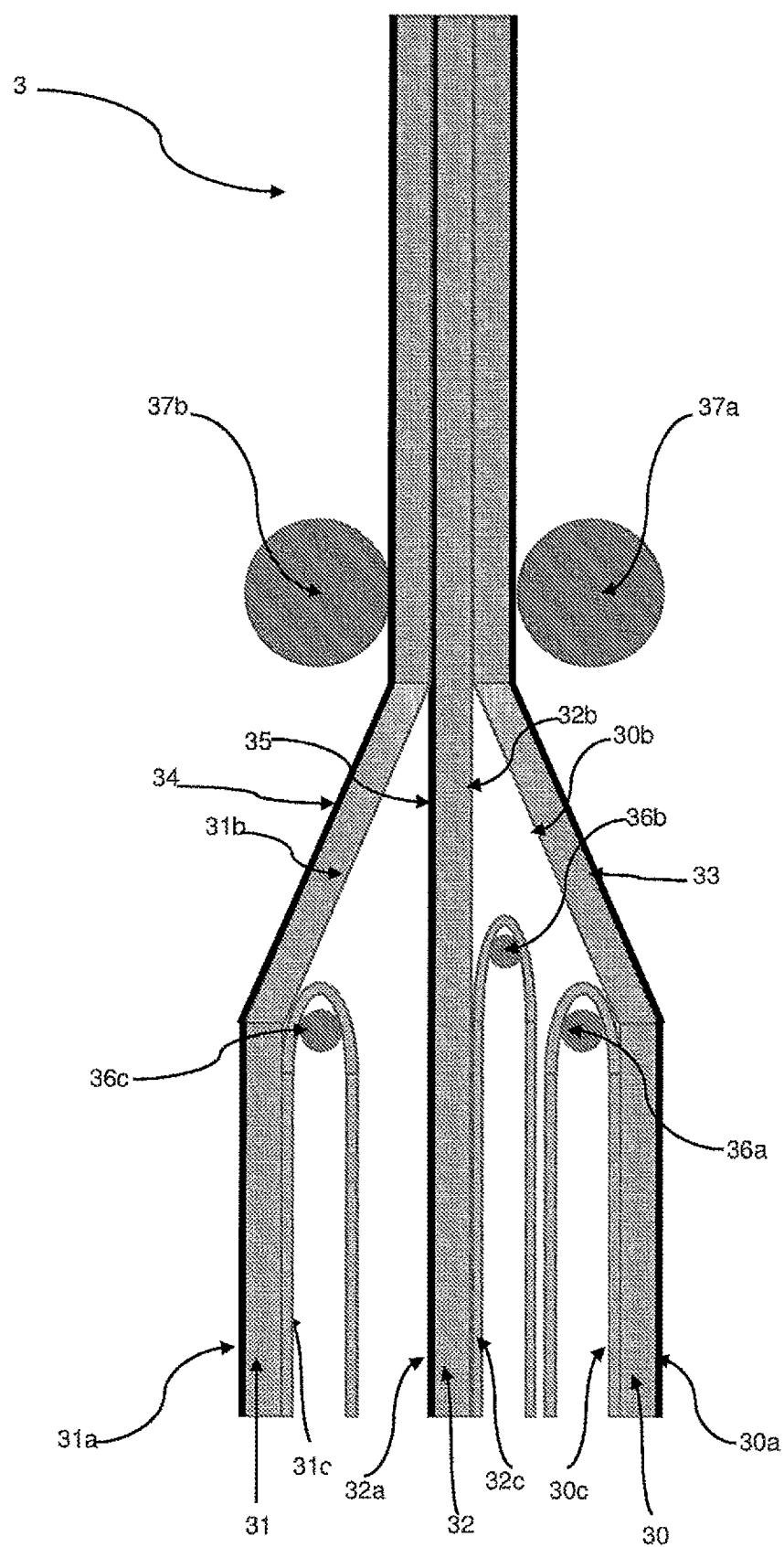
FIG. 5 shows a schematic continuous lamination process (part of a "roll-to-roll" process) for producing a CCM according to one embodiment of the invention.

FIG. 5 shows an alternative, continuous process for the production of a CCM 3 according to the invention. The product of the process is a long sheet of CCM 3 which can be stored as a roll (not shown). The first, second and third membrane components 30, 31 and 32 are also long sheets which can be stored as rolls (not shown) before processing into the CCM. The process shown in FIG. 5 is therefore the intermediate part of a roll-to-roll process.

Membrane components 30, 31 and 32, coated with catalyst layers on each of their first face 30*a*, 31*a* and 32*a* respectively and backing sheets 30*c*, 31*c* and 32*c* respectively on the other face are shown in FIG. 5. Backing sheets 30*c*, 31*c* and 32*c* are removed from the membrane components 30, 31 and 32 by peeling the backing sheets 30*c*, 31*c* and 32*c* away from the membrane components 30, 31 and 32 and passing them over rollers 36*a*, 36*b* and 36*c*. The three membrane components 30, 31 and 32 coated with catalyst layers 30*a*, 31*a* and 32*a* respectively are then brought together as they approach rollers 37*a* and 37*b* until they are brought into contact. The second face 30*b* of first membrane component 30 contacts the second face 32*b* of third membrane component 32.

Meanwhile, the second face 31*b* of second membrane component 31 contacts the first face 32*a* of third membrane component 32 (which is coated with recombination catalyst 35).

After the membrane components are brought into contact, the laminate structure is subjected to heat and pressure to consolidate the components into a CCM sheet 3, with a cathode catalyst layer 33 on one surface and an anode catalyst layer 34 on the other surface, and an internal recombination catalyst layer 35 within. The sheet 3 may then be formed into a roll (not shown) for storage and transportation, and/or cut into individual CCMs of appropriate size as needed.

EXAMPLES

Example 1—CCM Preparation

CCM 1 was prepared using three individual membrane components, Each membrane component had a nominal thickness of 17 μm, comprised a 900 EW Flemion™ ionomer from Asahi Glass Group with e-PTFE reinforcement and had a ceria hydrogen peroxide scavenger catalyst coated on one side. A cathode catalyst layer comprising Pt black in a dispersion of ionomer (aqueous Nafion 1100EW, 12 wt % w.r.t. Pt) was coated in an amount of 1 mgPt/cm$^2$ onto one of the membrane components, on top of the scavenger catalyst. An anode catalyst layer comprising $IrO_2$ black in a solution of ionomer (aqueous Nafion 1100EW from Chemours Corp, 12 wt % w.r.t. Ir) was coated in an amount of 2 mg Ir/cm$^2$ onto another of the membrane components, on top of the scavenger layer. A recombination catalyst comprising Pd supported on carbon black in a solution of ionomer (Nafion 1100EW, 300 wt % w.r.t. carbon) was deposited onto the final membrane component in an amount of 0.04 mg Pd/cm$^2$, on top of the scavenger catalyst. The catalyst layers were deposited using an ultrasonic spray coater (Sonotek ExactCoat with 120 kHz Impact coating head).

The three catalyst-coated membrane components were then arranged with the membrane component having the recombination catalyst layer in the middle, sandwiched between the other two membrane components with the anode and cathode catalyst layers facing outwards. The central membrane component was oriented such that the recombination catalyst layer faced the membrane component which carried the anode catalyst layer (as in FIG. 2).

These three layers were then laminated to form CCM 1.

Comparative Example 1—CCM Preparation

CCM A was prepared using a Nafion 117 (RTM) membrane (perfluorinated ion-exchange membrane of thickness 177.8 μm; equivalent weight (EW)=1100), A cathode catalyst comprising Pt black in a solution of ionomer (aqueous Nafion 1100EW, 12 wt % w.r.t. Pt) was coated in an amount of 1 mgPt/cm$^2$ on one side of the Nafion 117 membrane and an anode catalyst comprising $IrO_2$ black in a solution of ionomer (aqueous Nafion 1100EW, 12 wt % w.r.t. Ir) was coated in an amount of 2 mg Ir/cm$^2$ on the other side, to provide CCM A. The catalysts were deposited using an ultrasonic spray coater (Sonotek ExactCoat with 120 kHz Impact coating head).

Comparative Example 2—CCM Preparation

CCM B was prepared using three individual membrane components identical to those used for CCM 1, with e-PTFE reinforcement and a peroxide scavenger layer. The three membrane components were laminated to form a laminated membrane before being coated on one side with a cathode catalyst (as used in Membrane 1) and on the other side with an anode catalyst (as used in Membrane 1) to give CCM B.

Example 2—Electrolyser CCM Performance

Each CCM was tested at 60° C. using an electrolyser test station and a QCF25 cell fixture from Baltic Fuel Cells with parallel flow fields machined out of carbon on the cathodic side and titanium anodic side. The CCMs were assembled between a carbon base gas diffusion layer on the cathodic side (SGL 10BB) and a gold coated porous titanium sinter (Mott) on the anodic side. The assembled MEA was then heated in place using the reactant water passing on the cathodic side which in turn was heated via a tube-in-tube heat exchanger and water bath. The polarisation curves were recorded from 2 A cm$^{-2}$ down to 0.1 A cm$^{-2}$ holding at each point for 170 s. The hydrogen in oxygen was measured after cooling the anode exhaust gas with a heat exchanger using a four port thermal conductivity detector (GE-XMTC) with pure oxygen as the reference gas and calibrated against a 10% $H_2$ in $N_2$ reference gas and corrected for the different thermal conductivities of $O_2$ and $N_2$. The crossover data was logged continuously and the final points at each current density reported.

Figure 6:
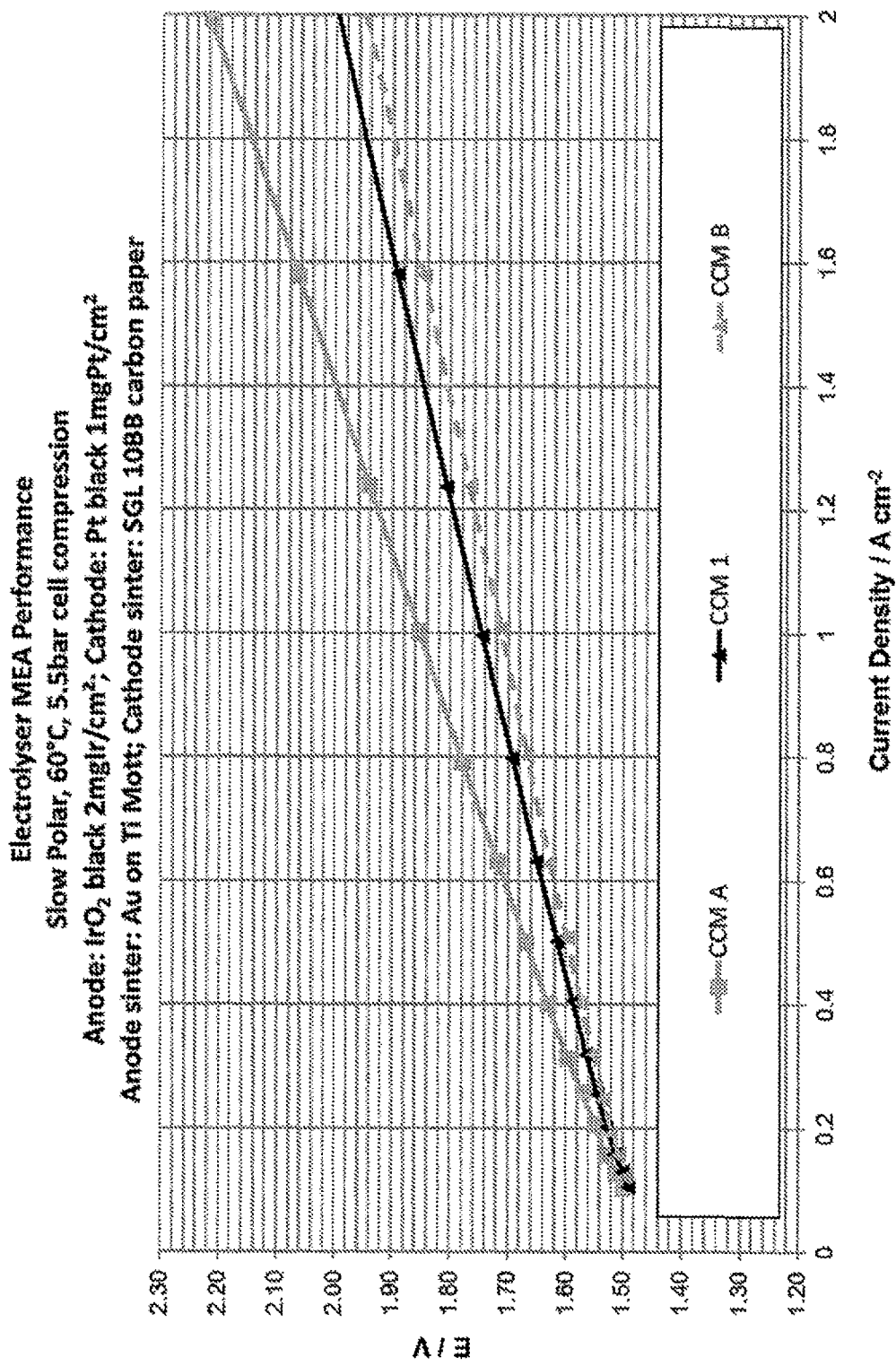
FIG. 6 is a graph showing the performance of an electrolyser including state of the art CCMs and a CCM according to the invention.

As shown in FIG. 6, improved performance (lower applied voltages at a given current) is seen for both CCM B and CCM 1 due to the reduced thickness of both membranes relative to CCM A. The improved performance can be attributed to the reduced resistance of the CCM from the lowering of the gradient of the polarisation curves for CCM 1 and CCM B compared to CCM A.

However, as shown in FIG. 7, the hydrogen crossover observed for CCM B was unacceptably high for the beginning of life. Typically, a limit of 2% hydrogen in oxygen is used to ensure that a flammable mixture does not exist in the system and such a high initial level will lead to a reduced operating lifetime of the system due to membrane thinning increasing crossover with time. The lowest level of hydrogen crossover was observed for CCM 1. Although the hydrogen crossover for CCM A was not as high as for CCM B, it was still higher than CCM 1.

CCM 1 was the only membrane tested which demonstrated both good performance and acceptably low levels of hydrogen crossover

The invention claimed is:

1. A catalyst-coated membrane for use in a water electrolyser, having a laminate structure comprising:
   a first layer comprising a first membrane component, the first membrane component having a cathode catalyst layer disposed on a first face thereof;
   a second layer comprising a second membrane component, the second membrane component having an anode catalyst layer disposed on a first face thereof; and
   an intermediate layer disposed between the first and second layers, comprising a third membrane component,
   wherein only a single face of the first membrane component has a catalyst layer thereon, and only a single face of the third membrane component has a catalyst layer thereon, the catalyst layer on the single face of the third membrane component is a recombination catalyst layer, and the recombination catalyst layer is located closer to the anode catalyst layer than to the cathode catalyst layer within the catalyst-coated membrane, and,
   wherein the first membrane component comprises an embedded reinforcing component and the third membrane component does not include an embedded reinforcing component.

2. The catalyst-coated membrane according to claim 1, wherein the first and second layers are each adjacent the intermediate layer.

3. The catalyst-coated membrane according to claim 1, wherein
   a second face of the first membrane component is adjacent the intermediate layer and a second face of the second membrane component is adjacent the intermediate layer, and the intermediate layer is oriented such that the recombination catalyst layer is disposed adjacent the second layer.

4. The catalyst-coated membrane according to claim 1, wherein the catalyst coated membrane has a total thickness of ≤120 μm.

5. The catalyst-coated membrane according to of claim 1, wherein the first, second and third membrane components are solid polymer electrolyte membrane components comprising an ionomer.

6. The catalyst-coated membrane according to claim 1, wherein one or more of the first, second and third membrane components further comprise a peroxide removal additive or a peroxy radical scavenger.

7. The catalyst-coated membrane according to claim 1, wherein the cathode catalyst comprises unsupported platinum black or platinum supported on carbon.

8. The catalyst-coated membrane according to claim 1, wherein the anode catalyst is selected from unsupported iridium oxide black or iridium on a support.

9. The catalyst-coated membrane according to any one of claim 1, wherein the recombination catalyst is selected from palladium on carbon, platinum on carbon, rhodium on carbon and platinum-group metal on silica.

10. The catalyst-coated membrane according to claim 1 consisting of the following layers, in order:
   (a) the cathode catalyst layer comprising a cathode catalyst;
   (b) the first membrane component;
   (c) the third membrane component;
   (d) the recombination catalyst layer comprising a recombination catalyst;
   (e) the second membrane component; and
   (f) the anode catalyst layer comprising an anode catalyst.

11. A method of making a catalyst-coated membrane according to claim 1 comprising:
   providing the first membrane component, the first membrane component having the cathode catalyst layer disposed on the first face of the first membrane component;
   providing the second membrane component, the second membrane component having the anode catalyst layer disposed on the first face of the second membrane component;
   providing the third membrane component, the third membrane component having the recombination catalyst layer disposed on the first face of the third membrane component; and
   laminating the first, second and third membrane components together to form a catalyst-coated membrane having a laminate structure, such that the third membrane component is disposed between the first and second membrane components within the laminate structure.

12. The method according to claim 11, wherein the first, second and third membrane components are laminated together in a single lamination step.

13. The method according to claim 11, wherein before lamination the membrane component are arranged such that a second face of the first membrane component faces a second face of the third membrane component and a second face of the second membrane faces the first face of the third membrane component.

14. A catalyst-coated membrane obtained by the method according to claim 11.

15. A water electrolyser comprising the catalyst-coated membrane according to claim 1.

16. A fuel cell comprising the catalyst-coated membrane according to claim 1.

17. A method of generating hydrogen gas comprising the steps of electrolysing water using the water electrolyser according to claim 15, and generating hydrogen gas.

* * * * *